(12) United States Patent
Böttcher et al.

(10) Patent No.: US 8,465,567 B2
(45) Date of Patent: Jun. 18, 2013

(54) METHOD FOR THE PRODUCTION OF HUMUS- AND NUTRIENT-RICH AND WATER-STORING SOILS OR SOIL SUBSTRATES FOR SUSTAINABLE LAND USE AND DEVELOPMENT SYSTEMS

(75) Inventors: Joachim Böttcher, Hengstbacherhof (DE); Haiko Pieplow, Bernau-Schönow (DE); Alfons-Eduard Krieger, Lichtenow (DE)

(73) Assignee: Palaterra GmbH & Co. KG, Hengstbacherhof (DE)

( * ) Notice: Subject to any disclaimer, the term of this patent is extended or adjusted under 35 U.S.C. 154(b) by 352 days.

(21) Appl. No.: 12/672,820

(22) PCT Filed: Aug. 10, 2007

(86) PCT No.: PCT/EP2007/007084
§ 371 (c)(1),
(2), (4) Date: Apr. 5, 2010

(87) PCT Pub. No.: WO2009/021528
PCT Pub. Date: Feb. 19, 2009

(65) Prior Publication Data
US 2010/0199734 A1    Aug. 12, 2010

(51) Int. Cl.
C05F 11/08    (2006.01)

(52) U.S. Cl.
USPC ............................................. 71/10

(58) Field of Classification Search
USPC ................... 71/8–10; 435/262–279
See application file for complete search history.

(56) References Cited

U.S. PATENT DOCUMENTS

| | | | |
|---|---|---|---|
| 4,501,604 A * | 2/1985 | Odaira | 71/15 |
| 5,534,042 A | 7/1996 | Tsuchida | |
| 5,603,744 A * | 2/1997 | K urner | 71/9 |
| 6,200,475 B1 | 3/2001 | Chen | |
| 6,223,687 B1 | 5/2001 | Windle | |
| 6,569,332 B2 * | 5/2003 | Ainsworth et al. | 210/603 |
| 6,645,267 B1 | 11/2003 | Dinel | |
| 2007/0261451 A1* | 11/2007 | Beckley et al. | 71/11 |
| 2009/0126270 A1* | 5/2009 | Johnson et al. | 48/61 |

FOREIGN PATENT DOCUMENTS

| | | |
|---|---|---|
| CN | 1820577 A | 8/2006 |
| DE | 1929195 U | 12/1965 |
| EP | 0168556 A2 | 1/1986 |
| EP | 0676385 A2 | 10/1995 |
| EP | 2188230 A1 | 5/2010 |
| JP | 11255572 A | 9/1999 |
| JP | 2000313683 A | 11/2000 |
| JP | 2004284936 A | 10/2004 |
| WO | WO-0100543 A2 | 1/2001 |

OTHER PUBLICATIONS

Lal, "Agricultural Activities and the Global Carbon Cycle," *Nutrient Cycling in Agroecosystems* 70: 103-116 (2004).
Glaser et al., "Ameliorating Physical and Chemical Properties of Highly Weathered Soils in the Tropics with Charcoal—A Review," *Biol. Fertil. Soils* 35:219-230 (2002).
Steiner et al., "Long Term Effects of Manure, Charcoal and Mineral Fertilization on Crop Production and Fertility on a Highly Weathered Central Amazonian Upland Soil," *Plant and Soil* 291: 275-290 (2007).
English Translation of the International Preliminary Report on Patentability for International Application No. PCT/EP2007/007084, dated Nov. 12, 2009 (7 pages).
International Preliminary Report on Patentability for International Application No. PCT/EP2007/007084, dated Nov. 12, 2009 (9pages).
Written Opinion of the International Searching Authority for International Application PCT/EP2007/007084, dated Aug. 10, 2007 (8 pages).
International Search Report for PCT/EP2007/007084, mailed Jun. 5, 2008 (4 pages).
English Translation of International Search Report for PCT/EP2007/007084, mailed Jun. 5, 2008 (4 pages).

* cited by examiner

*Primary Examiner* — Wayne Langel
(74) *Attorney, Agent, or Firm* — Clark & Elbing LLP

(57) ABSTRACT

The present invention relates to a method for the production of stable humus- and nutrient-rich and water-storing soil substrates with properties of anthropogenic soil types (Terra Preta) in which pyrogenic carbon, organic biomass, and/or natural mineral materials are used as initial materials in a fermentation process. The soil produced or treated according to the invention leads to a sustainably high soil yield such that mineral fertilizers are no longer needed for agricultural use. Moreover, the soil is suitable for use as a soil substitute, for use as a soil supplement, for greening developments, for preventing erosion, for improving regional water supplies, for preventing floods, for preventing climate change, for reducing carbon dioxide content in the atmosphere, for waste water cleaning and treatment, for exhaust air cleaning and building air purification, for creating material flow cycles from biogenic waste and/or waste water in order to develop and utilize land use and development systems.

17 Claims, No Drawings

METHOD FOR THE PRODUCTION OF HUMUS- AND NUTRIENT-RICH AND WATER-STORING SOILS OR SOIL SUBSTRATES FOR SUSTAINABLE LAND USE AND DEVELOPMENT SYSTEMS

CROSS-REFERENCE TO RELATED APPLICATIONS

The present application is the U.S. National Stage of International Application PCT/EP/2007/007084, filed Aug. 10, 2007.

The present invention relates to a method for the production of humus and nutrient-rich and water-storing soils or soil substrates having properties of anthropogenic soil types (Terra Preta) for sustainable land use and development systems. In the method, pyrogenic carbon and organic biomass are subjected to a fermentation process.

TECHNICAL AREA

The present invention is in the field of soil production and soil improvement for sustainable use in land use and development systems.

PRIOR ART

Various primitive peoples and Indian advanced civilizations were capable millennia ago of transforming infertile and nutrient-poor soils into extraordinarily productive, fertile soils, such as Indian black earth (also referred to as Terra Preta de Indio).

Currently, in order to cultivate plant cultures on infertile soil, some primitive peoples perform land clearing, in which the ashes of the burned-down trees act as fertilizer. In this way, it is possible to cultivate the fields for many years at least.

The secret of the Indian black earth (Terra Preta) is in its composition and production. Historical studies and scientific analyses have shown that the early primitive peoples converted wood into charcoal in a complex method, which is no longer available. In contrast to ash, however, charcoal does not fertilize, but rather binds water and nutrients in the soil. Therefore, soils fertilized with ash are already no longer fertile after a short time, while the soils having Terra Preta have the capability of keeping water and nutrients in the soil over a longer period of time and slowly dispensing them to the plants. The higher charcoal content of the black earth prevents the rain from washing the nutrients out of the soil. In the meantime, tens of thousands of such natural Terra Preta areas have been discovered distributed at various locations on the Earth. They all share the feature that plants grow significantly faster and produce significantly higher yields on this black earth.

Terra Preta can be designated as a solar-influenced flow equilibrium of organic-mineral soil colloids in symbioses of single cell and multi-cell soil organisms, higher plants, livestock, and humans.

Up to this point, no one has been successful in artificially generating the anthropogenic soil form of Terra Preta, which is similar to black earth. A method for producing these anthropogenic soil forms would be desirable for various reasons, for example, in order to build up sustainable land use systems worldwide, which permanently secure the food supply of humans, regulate the local water supply, purify waste water and air, and contribute to flood prevention and climate protection. In addition, the "disposal" of organic municipal wastes, which currently cause humans significant environmental problems, would be solved in the meaning of an ecological and economic circular economy.

The object of the present invention comprises providing a method for producing a soil form, which corresponds or is at least very similar to the anthropogenic black earth having the described long-lasting nutrient and water-storing properties, and describing the possible uses and applications of these artificially generated soil forms, which may result in sustainable land use and development systems.

This object is achieved by a method for the production of humus and nutrient-rich and water-storing soil substrates having properties of anthropogenic soil types according to claim 1, the soils or soil substrates produced by the method, and the uses thereof.

SUMMARY OF THE INVENTION

The present invention relates to a method for the production of humus and nutrient-rich and water-storing soil substrates having properties of anthropogenic soil types, which have a sustainable high soil fertility. The novel soil form produced according to the invention is based on a method in which pyrogenic carbon and easily decomposable organic biomass are mixed as starting materials either in containers, a facility, a ground surface, or a combination of these alternatives and subsequently subjected to a fermentation process with the aid of microorganisms.

In one embodiment, natural minerals, for example, in the form of fertilizers, limestone, mineral soils, or other mineral soil substrates may be introduced before or after the fermentation process. In a further embodiment, the soil substrate thus obtained is converted with the aid of soil organisms, such as worms, mites, etc., for a sufficient period of time to obtain a soil and/or soil substrate based on newly formed clay-humus complexes.

A permanently fertile soil substrate is provided by the production method according to the invention, which is based on the targeted production of nutrient-rich and water-storing clay-humus complexes and stable humus.

The present invention also relates to a soil or a soil substrate produced by the method according to the invention having properties of anthropogenic soil forms (Terra Preta).

Furthermore, the invention relates to a device for the production of soils or soil substrates which have the properties of anthropogenic soil forms (Terra Preta).

Furthermore, the invention relates to the possible uses and applications which similarly first result in sustainable land use and/or application systems. The soil produced or treated according to the invention results in a sustainable high soil fertility, so that mineral fertilization is no longer necessary for cost-effective usage of the ground area. Furthermore, the soil or the soil substrate is suitable as a soil replacement, as a soil supplement, for the greening of settlements, for erosion inhibition, for improving regional water supplies, for flood prevention, for reducing the carbon dioxide content in the atmosphere (climate protection), for purifying and conditioning contaminated water, for purifying exhaust air and building air, for providing material flow cycles of biogenic wastes and/or waste waters to develop and utilize land use and development systems.

DESCRIPTION OF THE INVENTION

Starting materials for the production of the soil form according to the invention are pyrogenic carbon and easily decomposable organic biomass.

The term "pyrogenic carbon" is understood to mean the carbon structures which arise through strong heating of organic and preferably lignaceous material. Pyrogenic carbon is found, for example, in the form of charcoal, sieve residues of charcoal, black earth, and wood ash.

The invention also comprises the suitable selection of the base and starting materials for the production of the soil according to the invention having the desired properties. These include, for example, organic municipal wastes, organic wastes from industry, trade, agriculture, forestry, and gardening and the lignaceous materials which, in connection with the method according to the invention, result in a complete circular economic system. Furthermore, it also comprises the development, conception, planning, and implementation of novel, sustainable land use and development systems, which are only made possible by the technology according to the invention.

In order to designate the various products and intermediate products of the soil forms according to the invention, the following designations are introduced. The intermediate product which is produced in a first production phase and is already usable as a soil substrate is designated as "initial human Terra Preta." Initial human Terra Preta is obtained in that the starting materials of pyrogenic carbon and organic biomass are mixed and subsequently fermented. In this step, natural minerals, such as nitrogen, phosphorus, potassium, etc. may optionally be added, for example, in the form of mineral soils. Initial human Terra Preta can already be used as a soil substrate for soil replacement, for soil improvement, or for soil supplementation.

A further treatment of the initial human Terra Preta obtained in this way results in a further soil form, which is designated as "active human Terra Preta." The above-mentioned initial human Terra Preta is treated further with soil organisms, such as worms and mites, for this purpose. This can be performed either in separate facilities, containers, or directly on the open area to be treated for soil improvement. In the latter case, the treatment can also occur through the immigration of natural soil organisms (e.g., earthworms). After a certain period of time under the effect of the soil organisms, the final product "human Terra Preta" results from the active human Terra Preta.

The core of the invention is the supply of pyrogenic carbon to a predominantly anaerobic fermentation process, in which a fermentation of an organic biomass mixture using microorganisms (e.g., bacteria, fungi, fungal spores, algae, etc.) and an intercalation of released nutrients and minerals into the pyrogenic carbon structures occur.

The term "fermenting" or "fermentation" is understood in the meaning of the invention as the conversion of biological, in particular organic materials with the aid of microorganisms (bacteria, fungi, or cell cultures). Fermentation can also be performed by the addition of metabolically-active enzymes or other biologically-active molecules (e.g., nutrient substrates of the microorganisms). The fermentation can include both aerobic procedures (e.g., acetic acid fermentation) and also anaerobic procedures (e.g., lactic acid fermentation).

The fermentation process can occur either in containers and facilities or directly on the open area. The fermentation process can run spontaneously using the microorganisms naturally present in the biomass. Alternatively, initial microorganisms or mixtures of various microorganisms (e.g., bacteria, fungi, cell cultures) may be added as starter cultures for the monitored control of the process and the production of initial human Terra Preta.

Through the fermentation process occurring under air exclusion, humus and nutrient-rich and water-storing clay-humus complexes arise, which have comparable properties to those of natural Terra Preta. The nutrient-rich and water-storing clay-humus complexes thus produced are chemically and biologically stable and are used as a permanent carbon accumulator having long-lasting binding capacity for nutrients and water.

The pyrogenic carbon can be introduced, for example, in the form of charcoal and/or its sieve residues, wood ash, etc., and/or be obtained by a pyrolysis process in a mobile or stationary pyrolysis facility from predominantly lignin-rich organic materials, such as wood, plant stalks, fruit stones, nutshells, etc., or bones. Bones have the advantage that they are particularly high in phosphorus.

The pyrolysis process is preferably operated under oxygen exclusion at approximately 100 to 1000° C. However, one skilled in the art understands adapting the corresponding pyrolysis conditions to the particular conditions, such as the type of the pyrolysis facility, the ambient pressure, the quantity, type, and composition of the pyrolysis material, etc.

In a preferred embodiment, the pyrolysis material can previously be chopped or pulverized and compressed into a pellet for the production of the pyrogenic carbon. This has the advantage that the pyrolysis process can be monitored better and a homogeneous pyrolysis product results, which encourages the subsequent fermentation. Otherwise, to obtain pyrogenic carbon, the pyrolysis material (e.g., according to rinds, grasses, wood, bones, etc.) is firstly separated according to the composition before it is supplied to the particular pyrolysis process.

In addition to the pyrogenic carbon, further usable products arise during the pyrolysis process, such as oil, wood tar, or gas, which may be used for power, heat, and/or cold production, for example. These byproducts are thus exploitable for a reasonable usage (e.g., to obtain energy) and are usable in the meaning of the invention for sustainable land use and development systems.

The hot air or the gas arising in the pyrolysis is used for optimizing the fermentation process in a preferred embodiment of the invention. The hot waste heat originating from the pyrolysis must be cooled to the temperature (30 to 40° C.) required for the fermentation process if necessary.

Furthermore, the exhaust gases of the pyrolysis contain ammonia, carbon dioxide, and water, which are converted into solid ammonium bicarbonate (hartshorn) upon conduction through the still hot pyrogenic carbon in the pores thereof. This byproduct can in turn be used as a long-term fertilizer in the meaning of the invention. A further positive aspect for conducting these gases through the still hot pyrogenic carbon can be seen in that the exhaust gases of the pyrolysis are purified. Any occurring harmful materials may thus be eliminated naturally by the pyrolysis process itself.

In a preferred pyrolysis method for producing pyrogenic carbon, finely pulverized wood (also having leaf mass) is placed in a heap, compacted, watered, and sealed extensively airtight, e.g., using earth. Alternatively, the method can also be performed using bunker silos or in special containers. After some time, a thermal rotting effect begins, upon which temperatures up to 80° C. arise in the interior. Pyrogenic carbon arises as the main product, which can be supplied to the fermentation process of the invention. Furthermore, hot water having a temperature of approximately 60° C. can be obtained via simple heat exchangers during the pyrolysis process. In addition, light gas arises, which can be used to obtain energy.

In addition to pyrolysis, further methods are also known to one skilled in the art for producing pyrogenic carbon. The method of hydrothermal carbonization is cited as an example.

The pyrogenic carbon, which is produced by diverse methods, has intramolecular carbon structures which may be influenced by the pyrolysis conditions, for example. The properties of the pyrogenic carbon used for the method according to the invention may thus be adapted for a high nutrient and water storage capacity.

Further modifications required for the invention are part of the preferred embodiments. For example, in a preferred embodiment, the pyrogenic carbon can be pulverized and/or sieved and homogenized with the organic biomass before the use according to the invention. The pyrogenic carbon can additionally be admixed with urine and/or urea solution and/or other solutions containing urea, in order to provide nitrogen and phosphorus, so that the positive properties are reinforced.

The easily decomposable organic biomass to be used for the production preferably comprises green plants and their residues, organic municipal wastes, organic wastes from industry, trade, agriculture and forestry and gardening, such as biodegradable waste, kitchen wastes, garden debris, human or animal feces, liquid manure, or fermentation residues from biogas facilities or other organic materials.

The introduction of heavy metals and toxic substances is to be avoided in consideration of sustainable land use. Coarse organic biomass can be pulverized and/or sieved and/or homogenized with the pyrogenic carbon before the production process of human Terra Preta.

The natural minerals required for the production may already be supplied in the form of mineral soils or mineral soil substrates in the phase of the production of the initial human Terra Preta, for example, or only in the phase of the surface application of active human Terra Preta to the soil.

The mineral soil is mixed either in containers or a facility before or after the fermentation with the organic biomass and the pyrogenic carbon, or is applied directly to the surface to be treated, or is already contained in the soil to be treated. The natural mineral soils are preferably obtained from the surroundings of the location of the production and/or used at the location of application to avoid transport costs and/or the environmentally-relevant consequences of transport.

The natural minerals (e.g., nitrogen, phosphorus, potassium) may be supplied as fertilizers, limestone, or in the form of mineral soils or other mineral soil substrates (e.g., clay substrates).

If the natural minerals are already supplied in the phase of the production of initial human Terra Preta, pulverization and/or sieving of the mineral soils can be required beforehand. Mixing with further mineral soils is also possible.

As previously noted, the intermediate product initial human Terra Preta, which is already usable as a soil substrate, is obtained in the first production phase of human Terra Preta. This preferably occurs via the mixing of the starting materials pyrogenic carbon and easily decomposable organic biomass and optionally natural minerals or mineral soils or mineral soil substrates in a suitable mixing ratio and the subsequent initiation of a fermentation process. The quantity of mineral soil is not critical. However, the nutrients are not to exceed specific concentrations, so as not to cause any harmful effects.

The suitable mixing ratio of the starting materials is calculated according to the contents of carbon, water, nutrients, and according to the pH value, as a function of the composition of the locally available starting materials.

The starting material pyrogenic carbon is preferably used in a quantity of at least 5% and the organic biomass is preferably used in a quantity of at least 50%. The preferred ratio is in a range from 10 to 20% pyrogenic carbon and 80 to 90% organic biomass. The quantity of minerals is admixed depending on the demand and application form of the soil and soil substrate according to the invention.

The values of the human Terra Preta are preferably to move in the range of the following parameters:
density: 1.3-1.4 g/cm$^3$
water content: approximately 25%
soil air content: approximately 20%
particles which can form slurry (smaller than 0.2 mm): at least 500 g/kg
organic carbon: approximately 40 g/kg, at least 15 g/kg thereof pyrogenic carbon
pH value ($H_2O$): approximately 5.5 to 6.5
nitrogen: at least 2 g/kg
phosphorus: at least 2 g/kg
C: N ratio: approximately 15
cation exchange capacity: 150 mmol$_c$/kg The minerals were already mixed with the starting materials in this example. The natural mineral soil or the natural minerals may also only be admixed later and/or be supplied in the course of the soil formation process (i.e., during the formation of human Terra Preta from active human Terra Preta) in a further production form.

The fermentation process can be performed according to the invention in containers, silos, boxes, heaps, soil trenches, etc., which may comprise various materials, such as concrete, steel, stainless steel, plastic, clay, loam, ceramic, etc.

Another embodiment according to the invention comprises surface fermentation, the starting materials being sealed as airtight as possible using plastic plates, film, and/or a mineral seal. Nearly anaerobic milieu conditions are caused for reliable implementation of the fermentation process.

Lactic acid fermentation is preferably of interest for the invention, in which sugar from the biomass is converted with the aid of microorganisms into lactic acid. Homofermentative bacteria, heterofermentative bacteria, bifidobacteria, or combinations of various fermentative strains are preferably used for the lactic acid fermentation. The pH is lowered to a value of as low as 4 by the fermentation. The pH can be neutralized in the soil substrate again by adding mineral soil or limestone after the fermentation process. The mineral soil or limestone thus has a double function: on the one hand, it is used as a mineral provider, on the other hand, it is used as a buffer system for the pH value.

For the reliable implementation of the fermentation process desired according to the invention, a biological starter culture, preferably made of ubiquitous microorganisms and/or already produced human Terra Preta and/or biomass which has already been subjected to a lactic acid fermentation process, can be admixed as a function of the starting materials.

The admixing of the biological starter cultures can already be performed manually and/or automatically during the mixing of the starting materials and/or only upon the introduction into the fermentation facility and/or only in the fermentation facility.

The fermentation is preferably performed at a temperature between 30 and 40° C. Locally existing excess heat can be used as a heat source in the meaning of a sustainable value-added chain, as occurs, for example, during the pyrolysis process, during fermentation processes in biogas facilities, during the composting, and/or during operation of block heating power plants. The easily convertible organic starting materials are preserved and stabilized in relation to microbial degradation by a controlled fermentation, in which the lactic acid fermentation and/or further bacterial and/or fungal exposures play a significant role.

The fermentation time which is preferred according to the invention is two to six weeks.

The pH value is lowered into the acid range, i.e., down to pH=4 by the fermentation processes (e.g., lactic acid fermentation). This pH reduction advantageously causes pathogenic microorganisms to be killed, whereby a pathogen-free soil substrate is obtained. The raising of the pH value is performed after the fermentation process by adding mineral soil or limestone, whereby a neutralization to an optimum pH value of 5 to 6.5 is achieved.

The initial human Terra Preta thus produced can be stored at cool temperatures for a long period of time, without substantially changing its structure.

In a subsequent preferred second production phase for producing human Terra Preta, an active human Terra Preta is obtained from the previously described initial human Terra Preta. This is preferably performed by the introduction and/or immigration of soil organisms, such as earthworms, compost worms, beetles, and mites. This process can occur both in the containers or fermenter facilities, in which the initial human Terra Preta was previously produced, or in special containers or facilities and on open soil areas.

Stable clay-humus complexes arise through the activity of these higher soil organisms and the symbiosis of microorganisms and macroorganisms. Extensive organic fixing of plant nutrients and the buildup of complex physical and chemical buffer systems thus occur. Gaseous and liquid nutrient losses are thus avoided and carbon is accumulated in a large amount. A starting substrate having optimum living conditions for higher plants results.

The process is preferably designed so that the higher soil organisms may develop optimally, for example, through moisture and temperature regulation.

Admixing limestone, e.g., algal limestone, is also advisable according to the invention in order to optimize the soil formation processes.

Depending on the process conditions, the production of active human Terra Preta lasts between three months and one year.

If the soil formation processes of the active human Terra Preta have progressed extensively after this time, it can be assumed that now human Terra Preta has resulted. A particular property of the human Terra Preta is that it grows further upon the introduction of organic biomass, i.e., the carbon compounds and minerals of the biomass are incorporated stably and permanently into the soil structure.

To perform the method according to the invention, the invention also relates to a stationary or mobile device, using which it is possible to produce the soil according to the invention, if desired on location.

The device according to the invention comprises a fermenter facility, in which fermentation of the biomass occurs with the aid of microorganisms. The fermenter facility can be operated both as stationary and also mobile. A modular structure of the fermenter facility for the various production phases is also possible.

The fermenter facilities according to the invention preferably have apparatuses such as drainage units, floor drains, openings, etc., so that a controlled liquid and gas exit can be ensured. Furthermore, the fermenter facilities according to the invention may have apparatuses which ensure settable constant temperatures during the process. An automatic process control of the fermentation process can occur via measuring sensors which detect the temperature, the pH value, the carbon dioxide content, the methane content, and/or the hydrogen sulfide content, for sample.

Furthermore, in a preferred embodiment the device comprises a pyrolysis facility for producing pyrogenic carbon, in which the thermal cleaving of the chemical compounds of the lignin-rich, organic material occurs under oxygen exclusion, i.e., under nearly anaerobic conditions.

A pulverization and compression facility can be connected upstream from the pyrolysis facility, in order to obtain a pellet from various lignin-rich material. Furthermore, the facility can contain a sieve apparatus, such as a drum sieve.

Furthermore, the fermenter facility according to the invention comprises apparatuses which allow the waste heat generated during the pyrolysis to be supplied to the fermenter facility to optimize the fermentation process.

The human Terra Preta produced according to the invention results in an increase of the soil fertility over a long period of time, which cannot be achieved to this extent by the mixing performed up to this point of ash, charcoal, compost, liquid manure, manure, fermentation residues, humus, and/or artificial fertilizers into the soil, for example.

Due to the intercalation of organic substances in the pyrogenic carbon structures, the human Terra Preta according to the invention, having its large surface area and low degradability, acts as a long-term accumulator and buffer system in the soil. Furthermore, rapid mineralization of the intercalated organic substance and the nutrients is avoided.

The human Terra Preta according to the invention is distinguished by a stable biological microsystem, in which biological, physical, and chemical processes are in long-term equilibrium. It is thus suitable for arid and humid land use systems. Through the use of a mobile pyrolysis furnace and the subsequent fermentation process, the production of the clay-humus complexes according to the invention is possible at nearly any location of the earth. Biomass which was only burned or disposed of as waste (e.g., garden debris, liquid manure, feces, biodegradable wastes of the cities) up to this point can be used efficiently.

Furthermore, the artificially generated clay-humus complexes according to the invention can have a significant role for climate protection upon large-area application. Plants require the carbon dioxide dissolved in the atmosphere for their growth, which they take from the air. If one carbonizes lignin-rich biomass and incorporates the pyrogenic carbon thus obtained into the soil after completed fermentation, carbon dioxide is permanently withdrawn from the atmosphere. This is also performed by the preservation of biomass through the fermentation process and the subsequent intercalation in the form of stable humus.

The climate-relevant greenhouse gas emission of methane and nitrous oxide from agricultural land may additionally be reduced by the significantly higher area productivity of the clay-humus complexes according to the invention. Completely novel perspectives are opened up to ecological cultivation and closing of nutrient loops in highly populated global areas.

Preferred Use and Application Forms of the Invention

Numerous possibilities and variants are available as the preferred use and application forms according to the invention of human Terra Preta and the intermediate products initial human Terra Preta and active human Terra Preta.

In a preferred variant, the products according to the invention may be applied directly to the soil or the area of the future application and/or incorporated therein and/or piled in dams. If the production of initial human Terra Preta and/or active human Terra Preta has already occurred on the areas and/or the soil, the application or incorporation can be dispensed with.

A usage form according to the invention for this application comprises the sustainable improvement of the soil fertility, e.g., to increase the gardening and/or agricultural and/or forestry production and/or while dispensing with artificial soil fertilizing. For example, a significant increase of the food production would thus be possible in the global view, which could in turn contribute to the worldwide fight against hunger. Moreover, new possibilities in renewable energy, e.g., through energy plant production or energy storage by green plants, would result through the increase of the area productivity of agricultural and forestry soil.

A further preferred form of application according to the invention is the introduction of human Terra Preta, initial human Terra Preta, and/or active human Terra Preta into beds, plant pots, containers, atriums, winter gardens, greenhouses, etc., for example, for interior greening, municipal and structural greening, crop and decorative plant cultivation, etc. In this way, for example, completely new possibilities for the design and circular economic model would be provided for architecture and/or city planning, for example. Municipal wastes, such as biodegradable waste, waste water, feces, etc., could be incorporated into small loops using the technology according to the invention and contribute to green design, food production, etc.

A further form of use according to the invention is humus enrichment and stabilization of soil, e.g., in arid or humid regions to inhibit erosion and/or store water.

A further form of use according to the invention comprises the improvement of soil in steppe and/or desert regions for the containment and/or regression of steppe and desert regions. Through a targeted re-cultivation of such fields with location-appropriate plants, the food and/or energy plant production may in turn be increased.

A further form of use according to the invention comprises the improvement of the water absorption capacity of soil and thus the improvement of regional water supplies and flood prevention. A significant part of the worldwide field areas are not capable of buffering and/or storing large amounts of rainwater because of a lack of humus content, so that this water drains relatively rapidly into streams, rivers, and lakes, and can result in floods under certain circumstances here. This water is simultaneously missing in the regional water supply. The human Terra Preta and/or initial human Terra Preta and/or active human Terra Preta according to the invention are capable of absorbing and/or storing up to 200 L/m$^2$ of liquid. For example, field areas cultivated using human Terra Preta may absorb large amounts of precipitation and temporarily store it. The stored water is then slowly discharged to plants and/or to the groundwater, which equalizes the regional water supply and simultaneously results in flood prevention.

A further form of use according to the invention is targeted contributions to climate protection. This is already performed solely by a surface-covering application of the invention, because carbon compounds from biomass are intercalated stably in the soil in a large amount and thus do not reach the atmosphere as carbon dioxide, as is the case in the event of aerobic degradation processes, for example. In particular in agriculture, significant methane and nitrous oxide emissions, which are harmful to the climate, arise through the discharge of liquid manure from cattle raising and/or fermentation residues from biogas facilities. Through a targeted application of the invention, e.g., during the binding of this agricultural biomass in the production of the products according to the invention and/or by applying this biomass to field surfaces cultivated using human Terra Preta, methane and nitrous oxide emissions which are harmful to the climate may be significantly reduced.

A further form of use according to the invention is the application in the field of contaminated water purification and preparation. In a preferred application, surfaces cultivated using human Terra Preta may have contaminated water of domestic, communal, industrial, and/or agricultural origin applied to it. The accumulation capability of the surfaces, which is increased by the application according to the invention, results in a stable intercalation of carbon compounds and nutrients and storage of water. These areas are thus outstandingly suitable, on the one hand, for the cultivation of water-consuming useful plants, e.g., as an energy plant plantation having reeds and/or grasses and, on the other hand, valuable carbon fractions and nutrients from the contaminated water are reasonably used in a manner which adds value, while they are destroyed with energy use during conventional treatment.

A further use form according to the invention is the application in the field of exhaust air purification and building air conditioning. In a preferred application, surfaces cultivated using human Terra Preta and/or filled containers, beds, facilities, etc. may be used for purifying exhaust air and/or conditioning building air. In a preferred embodiment, the air to be purified and/or conditioned is conducted via distributor apparatuses through the soil substrate and absorbed by microorganisms, fungi, etc. in the metabolism and decomposed into individual molecular structures. These are in turn stably intercalated in the soil substrate and are available to plants for humus and nutrient supply. A novel form of application according to the invention is the targeted use of beds, plant containers, facilities, etc., which are filled with human Terra Preta, inside and/or outside buildings for building air conditioning and simultaneous greening. The building air is conveyed via devices, such as fans, into the distributor apparatuses of the beds, plant containers, facilities, etc., which are filled with human Terra Preta, purified and conditioned therein, and subsequently returned back to the building via the surfaces and/or openings.

A further form of use according to the invention is the application in the field of the provision of material flow cycles of biogenic wastes and/or wastewater from various usage units, such as single households, buildings, settlements, villages, cities, forestry and agriculture, gardening, trade, and industry. Using the technology according to the invention, numerous biogenic wastes and/or wastewater from the particular usage units may be treated, conditioned, and used for soil improvement, food provision, energy and crop plant production, water and air purification, etc., therein, for example.

The invention comprises both the production of human Terra Preta, initial human Terra Preta, and/or active human Terra Preta having the fields of application described above, and also the disposal and simultaneous exploitation of municipal wastes, wastewater, etc., which may often result in significant environmental strains.

Accordingly, the invention also comprises the selection of the basic materials for the production of human Terra Preta, initial human Terra Preta, and/or active human Terra Preta, such as organic wastes, wastewater, fermentation residues, liquid manure, garden debris, lignaceous materials, ashes, etc., which result in a complete circular economic system in connection with the method according to the invention.

The development, conception, planning, and implementation of novel, sustainable land use and development systems, which are only made possible by the technology according to the invention, are associated with a further form of application according to the invention.

EXAMPLE

The following examples illustrate an embodiment of the variants of various embodiments described here. The invention is in no way to be restricted to these examples. The various embodiments and possible uses of the invention result from the claims.

Example 1

Pulverized and sieved charcoal was introduced in a ratio of 1:4 with previously pulverized and homogenized organic biomass from kitchen waste, garden debris, and human or animal feces into a container. The mixture was subsequently inoculated with a mixture of fermentation-active microorganisms as a starter culture. The container was covered and left standing for approximately four weeks, in order to allow the fermentation process. A drain was attached to the container for soil drainage, in order to avoid silting. After the fermentation time, mineral soil was added to the mixture and a further incubation for 4 weeks was performed. The soil substrate thus obtained was packaged and stored. For fertilization, the soil substrate was applied to a soil surface. The area thus treated proved to be extraordinarily high in nutrients and productive similarly to the anthropogenic soils such as Terra Preta.

Example 2

Like example 1, but the initial human Terra Preta obtained in the first production phase was applied directly to a soil surface to be treated and mixed with mineral soil. The initial human Terra Preta was converted to active human Terra Preta by the presence of soil organisms, such as earthworms and mites. After a further conversion time of a few weeks, human Terra Preta was finally obtained as an end product.

Example 3

Like example 2, but the external addition of soil organisms into the soil was performed.

Example 4

Like example 3, but the soil organisms were added to the initial human Terra Preta in the container and incubated therein with the soil substrate. The human Terra Preta thus obtained was applied as a soil supplement to the soil area to be treated.

Example 5

Pulverized and sieved charcoal was applied as the pyrogenic carbon in a ratio of 1:4 with previously pulverized organic biomass from kitchen waste, garden debris, human or animal feces, and previously sieved mineral soil and a mixture of fermentation microorganisms on the mineral-poor soil surface to be treated. An surface fermentation was subsequently performed for six weeks, in that the surface was covered with a silage film, so that nearly anaerobic states prevailed. After the fermentation time, the silage film was removed and algal limestone was applied and superficially incorporated. The soil area was covered with earth and left standing for two weeks, in order to cause a neutralization of the pH value of the soil and an immigration of natural soil organisms, which also contributed to sufficient mixing, so that no further mixing was necessary. After approximately four weeks, the soil was ready for planting.

Example 6

Like example 5, except that the pyrogenic carbon was applied directly to mineral soil with the previously pulverized organic biomass for surface fermentation. Mixing in externally added soil organisms was not required.

The invention claimed is:

1. A method for producing stable humus and nutrient-rich and water-storing clay-soil substrates having properties of anthropogenic soil forms (Terra Preta), comprising the following steps:
   (a) mixing pulverized and/or sieved pyrogenic carbon with previously pulverized and homogenized easily decomposable organic biomass,
   (b) inoculating the mixture by admixing a starter culture made of microorganisms to perform an anaerobic fermentation in the form of a lactic acid fermentation and/or by admixing already produced soil substrates and/or by admixing a biomass which was subjected to the lactic acid fermentation,
   (c) incubation of the mixture under air exclusion to perform a lactic acid fermentation at a temperature between 30° C. and 40° C. and a pH value in the acid range, controlled soil drainage and degassing being provided during the fermentation process.

2. The method according to claim 1, characterized in that the pyrogenic carbon is used in a quantity of at least 5% and the organic biomass is used in a quantity of at least 50%.

3. The method according to claim 1 or 2, characterized in that the ratio of pyrogenic carbon to organic biomass is 1:4.

4. The method according to claim 1, characterized in that the soil/soil substrate obtained after method step (c) is either packed and stored, or introduced or applied to a soil surface to be treated.

5. The method according to claim 1, characterized in that the method also comprises step (d), in which soil organisms are introduced either into the mixture after the fermentation in a fermenter facility, in special containers and facilities, or directly into the soil to be treated, so that soil organisms naturally present in the soil may cause the conversion and further processing of the soil substrate.

6. The method according to claim 1, characterized in that natural minerals, mineral soils, or other mineral soil substrates, are admixed, introduced, or applied to the mixture, the soil/soil substrate, or the surface to be treated.

7. The method according to claim 1, characterized in that the pyrogenic carbon is introduced in the form of charcoal, sieve residues of charcoal, black earth, wood ash, or other pyrogenic carbon structures, or mixtures thereof.

8. The method according to claim 1, characterized in that the pyrogenic carbon is obtained by pyrolysis or a hydrothermal carbonization process.

9. The method according to claim 8, characterized in that the exhaust heat of the pyrolysis process is conducted to the fermentation process.

10. The method according to claim 1, characterized in that the pyrogenic carbon is admixed with urine and/or urea solution and/or other solutions containing urea before or in step (a).

11. The method according to claim 1, characterized in that green plant residues, organic municipal wastes, organic waste from industry, trade, agriculture and forestry and gardening, biodegradable wastes, kitchen wastes, garden debris, human or animal feces, liquid manure, or fermentation residues from biogas facilities or other organic biomass is used as the easily decomposable organic biomass.

12. The method according to claim 1, characterized in that the fermentation process is performed in containers, silos, boxes, heaps, ground trenches, or in a fermenter facility.

13. The method according to claim 1, characterized in that the lactic acid fermentation is performed as surface fermentation, in which the starting materials, and optionally the admixed mineral soil, are sealed as airtight as possible in order to cause nearly anaerobic milieu conditions.

14. The method according to claim 1, characterized in that the lactic acid fermentation process is performed for a duration of approximately two to six weeks.

15. The method according to claim 5, wherein said soil organisms are selected from the group consisting of earthworms, compost worms, beetles, and mites.

16. The method according to claim 6, wherein (i) said natural mineral is selected from the group consisting of nitrogen, phosphorous, and potassium, (ii) said mineral soil is a fertilizer or limestone, and (iii) said mineral soil substrate is a clay substrate.

17. The method according to claim 13, wherein said starting material is pyrogenic carbon or organic biomass.

* * * * *